United States Patent [19]

Nocilini et al.

[11] 4,381,552
[45] Apr. 26, 1983

[54] STANBY MODE CONTROLLER UTILIZING MICROPROCESSOR

[75] Inventors: John D. Nocilini, Margate; Ronald E. Sharp, Sunrise; Emilio J. Cuadra, Miami, all of Fla.

[73] Assignee: Motorola Inc., Schaumburg, Ill.

[21] Appl. No.: 208,101

[22] Filed: Nov. 18, 1980

Related U.S. Application Data

[63] Continuation of Ser. No. 967,761, Dec. 8, 1978, abandoned.

[51] Int. Cl.³ ............... G06F 13/00; G06F 1/00; G11C 7/00
[52] U.S. Cl. ............................ 364/900; 364/707; 365/227
[58] Field of Search ... 364/200 MS File, 900 MS File, 364/707; 365/226, 227

[56] References Cited

U.S. PATENT DOCUMENTS

| | | | |
|---|---|---|---|
| 3,609,711 | 9/1971 | Gunn | 365/226 |
| 3,680,061 | 7/1972 | Arbab et al. | 365/227 |
| 3,736,569 | 5/1973 | Bouricius et al. | 365/227 |
| 3,855,576 | 12/1974 | Braun et al. | 340/146.2 |
| 3,855,577 | 12/1974 | Vandierendonck | 364/200 |
| 3,941,989 | 3/1976 | McLaughlin et al. | 364/900 |
| 3,976,995 | 8/1976 | Sebestyen | 325/55 |
| 4,137,563 | 1/1979 | Tsunoda | 364/200 |

*Primary Examiner*—Eddie P. Chan
*Attorney, Agent, or Firm*—Margaret Marsh Parker; Edward M. Roney; James W. Gillman

[57] ABSTRACT

Logic circuitry in a portable electronic device is combined with the microprocessor to reduce power consumption in the microprocessor and its associated memories during inactive periods of the device, with periodic sampling for inputs from peripherals or received data which would require active operation of the device.

7 Claims, 4 Drawing Figures

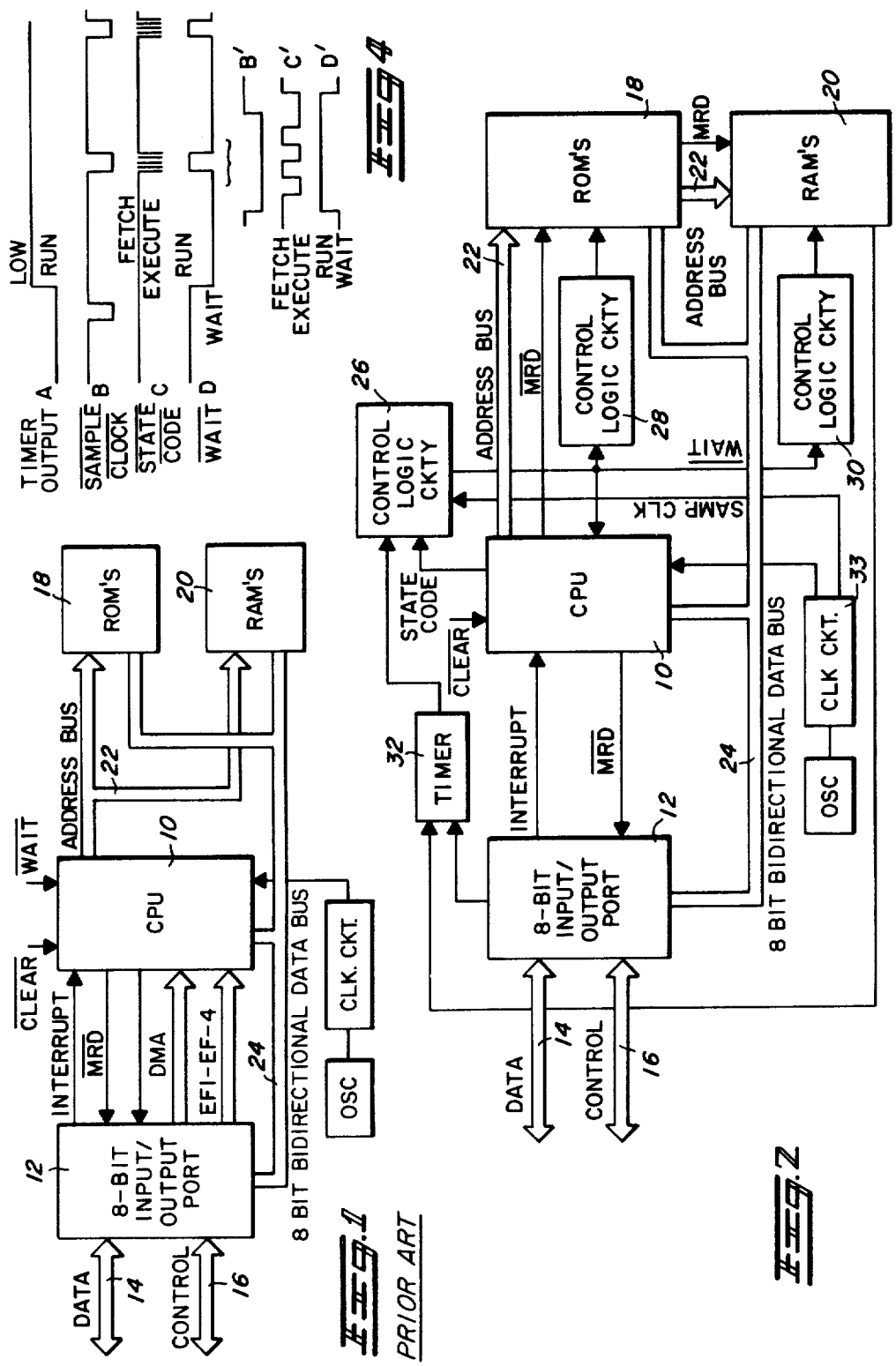

STANBY MODE CONTROLLER UTILIZING MICROPROCESSOR

This is a continuation of application Ser. No. 967,761, filed Dec. 8, 1978, now abandoned.

BACKGROUND OF THE INVENTION

This invention relates to the field of portable electronic devices containing microprocessors and more particularly to power saving circuitry therefor.

Along with the increasing use of microprocessors in a wide range of products has come their use in portable products. Many of these are highly sophisticated devices, performing a variety of functions and requiring extensive memory elements; e.g., several random access memories (RAM's) and several programmable memories (PROM's, EROM's or EPROM's). When it is considered that these devices, if operated continually as many must be, consume considerable amounts of power, it becomes apparent that there is a need for power saving methods.

There are, in the prior art, many schemes for powering-down battery supplied devices when full operation is not desired or necessary. One example is shown in U.S. Pat. No. 3,855,576, assigned to the same assignee as is the present invention and which covers a pager receiver wherein a precision oscillator and a counter timer provide a one-fifth duty cycle signal which is utilized when no message is being received and turns off the power for most of the unit during such periods.

In portable units containing microprocessors and their associated memories, it is even more advantageous to be able to reduce power whenever possible since power drain may be unduly high in devices containing EROM's or EPROM's (as in the presently described application) such devices require relatively large amounts of power while being accessed, but can have power removed without any loss of information.

SUMMARY OF THE INVENTION

It is therefore an object of the present invention to provide the capability for reducing power drain in a battery powered device which includes a microprocessor and its associated memories.

It is a particular object to utilize the microprocessor itself to control this power conservation.

In a device including the present invention, a microprocessor and its associated memories are controlled as to power consumption by the microprocessor and associated logic circuits. After the end of the period of activity, the microprocessor is programmed into a loop which provides for a fully-powered "hold" period of several seconds. If no activity occurs during this hold period, either from an external source or generated at the device, the device goes into a mode wherein sampling occurs at intervals to activate the device fully when full operation is required.

The microprocessor has two operational modes therefore, active and standby and, through an I/O port and a timer, provides a delayed signal indicating which of said modes the microprocessor is in. There are memory elements, both RAM and ROM, coupled to the microprocessor for the interchange of data stored therein. A clock circuit supplies a signal having a short duty cycle, and logic circuitry is coupled to receive the output of the clock and the mode responsive signal from the microprocessor to cause the microprocessor and its memory elements to require a reduced level of current from a battery supply during periods of inactivity.

BRIEF DESCRIPTION OF THE DRAWINGS

FIG. 1 is a block diagram showing a typical microprocessor system as known in the prior art.

FIG. 2 is a block diagram similar to FIG. 1 with some simplification and showing the application of the invention thereto.

FIG. 4 is a timing chart of the signals in a portion of the logic circuitry of FIG. 3.

DETAILED DESCRIPTION OF A PREFERRED EMBODIMENT

Figure 3:
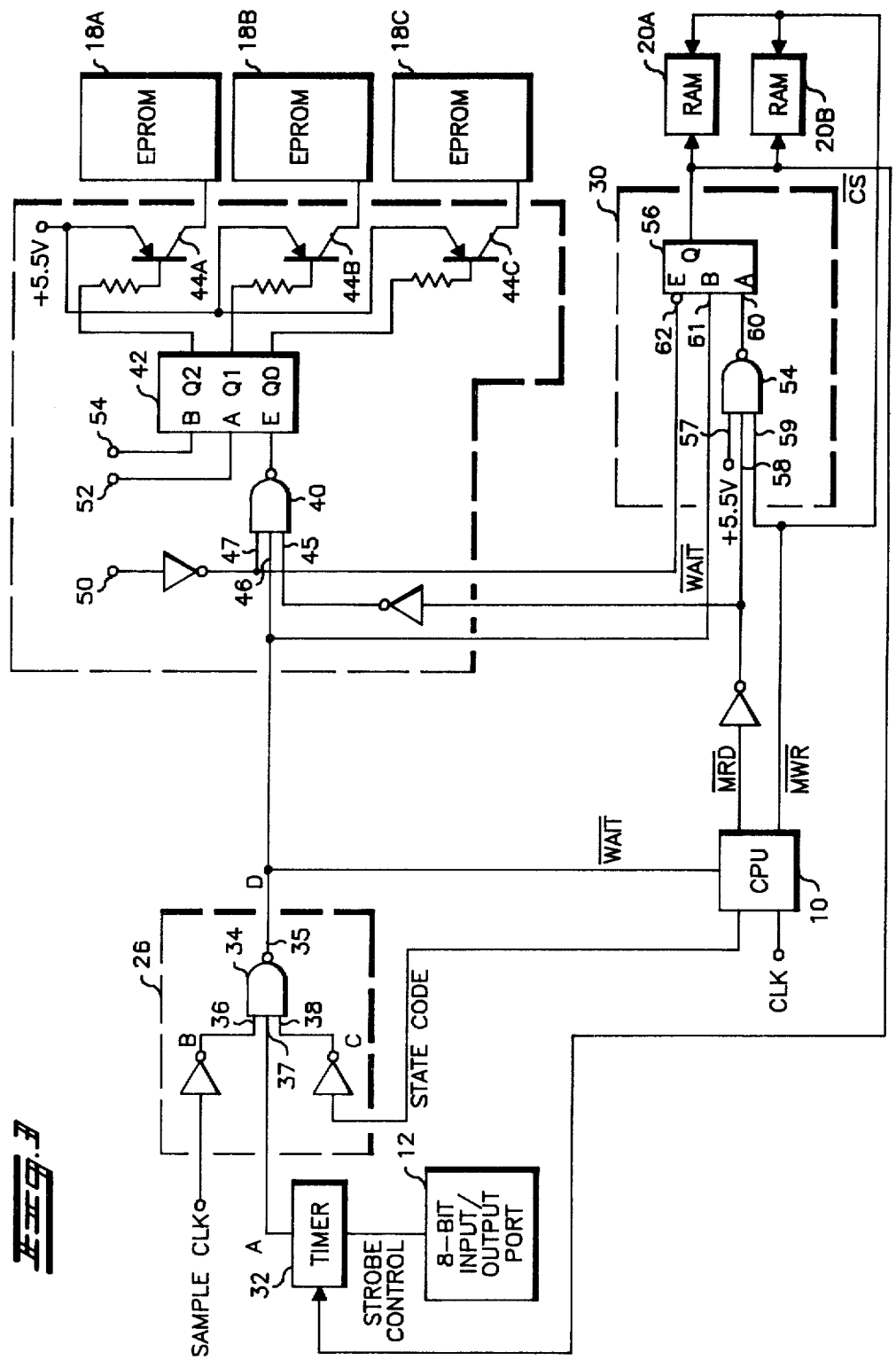
FIG. 3 is a diagram similar to that of FIG. 2 with details of certain portions added.

Before beginning the description of the present invention it may facilitate understanding to discuss FIG. 1 which is taken, with some simplification, from a typical microprocessor application diagram as given by the manufacturer. A microprocessor 10 is coupled to an interface unit 12 for supplying it with data and control as shown at points 14 and 16 respectively. Also indicated are read-only (ROM) memories 18 and random access memories (RAM) 20. These four units are intercoupled by an address bus 22 and an eight bit bidirectional data bus 24.

In FIG. 2, the diagram of FIG. 1 has been further simplified and has had the major elements of the present invention inserted. These include in particular control logic circuitries 26, 28 and 30 respectively. A timer 32 is shown coupled to the control logic circuitry 26 and to the interface 12 and the RAMs 20, but this is merely a drawing device for indicating a timing mechanism which could as well be contained within a loop of the program of the microprocessor 10. A sample clock signal from clock circuit 33 is also coupled to circuitry 26.

In FIG. 3 a further elaboration of the diagram of FIG. 2 is shown. In particular, the details of the control logic circuitry blocks 26, 28, 30 are shown as logic elements. For better understanding of the circuitry of the invention, a typical environment will be described, but it is to be noted that the invention is not to be considered as limited thereto but to be limited only by the appended claims.

In the environment as shown, which is further explained in U.S. Pat. No. 4,247,908, filed as of even date with the present application, a two-way portable radio device similar to those presently used in public safety work is combined with a data terminal including keyboard, read-out for display of alphanumeric data and the capability of adding such peripherals as a light pen or other photosensitive device for reading bar code patterns such as the MID product code. A number of the basic devices could be used as in warehouse inventory where they would replace data terminals wherein data is entered by a keyboard and either stored via magnetic tape or wired by cable back to a central point. There are, of course, many applications where almost instantaneous two-way transmission of data is required, one example being a train yard where box car identification symbols can be transmitted by personnel stationed at strategic points in the train yard and information as to the disposition of the box cars can be sent back immediately.

As in most battery operated devices, beginning probably with the flashlight, it is desirable to avoid waste of battery power. In a two-way radio/data terminal combination as described above, however, it is impossible to utilize a simple on/off switch as in the flashlight. Other circuitry solutions to the problems have been proposed and one is described hereinabove. In the present invention however a microprocessor which is an integral part of the device is utilized to help provide this power conservation. The three sections of logic circuitry 26, 28 and 30 and the microprocessor therefore help provide functions beyond those of the normal battery saver device or circuitry. The specific details on these will be pointed out in the description below relating to FIGS. 3 and 4.

In FIG. 4, signals A, B, C and D are shown, with a small portion of each of B, C and D (designated as B', C', D') expanded below for clarity.

The signal around which the invention revolves is 4D customarily designated $\overline{WAIT}$ which is the output signal of a NAND gate 34 in logic circuitry 26 and which is coupled to the $\overline{WAIT}$ input of the microprocessor, a preferred embodiment being an RCA microprocessor CDP 1802. This $\overline{WAIT}$ signal is shown in FIG. 4 as signals D and D' and will be a high level signal when it is desired to have full operation of the microprocessor and its associated memories. Referring to FIG. 3, it will be seen that the signal D on output 35 of the NAND gate 34 is derived from three inputs. The first of these, on terminal 36, is a sample clock B and B' shown in FIG. 4 and in this case happens to be a 1/23 duty cycle signal. This particular duty cycle is not an exact requirement but is a workable duty cycle and, coincidentally, such a signal is available in the particular device with which the invention has been actually applied. In other devices, any desired low duty cycle signal could be used. The signal A coming into the input 37 of the NAND gate 34 is from the block 32 marked "timer" which as explained above is not a hardware timer, per se, but a loop in the programming of the microprocessor and this signal will be discussed further hereinbelow. The third input to the NAND gate 34, coming to terminal 38, is a signal from the microprocessor 10, termed "State Code" C and C' and is the signal indicating the state of the microprocessor; i.e. "fetch" or "execute". This prevents the microprocessor from being powered down while in the "execute" state which would be undesirable. The purpose of the timing loop represented as timer 32, is to allow sufficient time, following the end of an active period in the device, and before powering down, to be sure that no further communications are intended to be transmitted in either direction. In practice it has been found that a seven second time period is usually sufficient to determine this.

The control logic circuitry 28 includes a NAND gate 40 and an IC 42, the latter being preferably embodied by a Dual Binary to 1-of-4 Decoder/Demultiplexer such as the MC14556 manufactured by Motorola, Inc. Also included in the circuitry 28 are three PNP transistors 44a, b and c. These three transistors are controlled by the decoder/demultiplexer 42 and remove all power from the EPROMs 18a, b and c when the $\overline{WAIT}$ signal is low. It will of course be obvious to those skilled in the art that other logic circuitry could be utilized to remove this power. It is to be noted that the EPROM's can be completely powered down, that is, all running power removed during the inactive parts of the 1/23 duty cycle since no information can be lost thereby, and approximately 95% of the power otherwise used therein is saved by use of the invention. The control circuitry 28 as shown requires five inputs as used in the device described as the present environment. One of these is the $\overline{WAIT}$ signal coming from terminal 35 of NAND 34 to terminal 46 of NAND 40, and is shown in FIG. 4. The input to terminal 47 of the NAND gate 40 is a signal from terminal 50 and is the memory select signal. The signal to the terminal 45 of NAND 40 is the MRD from the microprocessor 10 which is the "read" control for the memories. The address signals on two other terminals 52 and 54 are also coupled from the microprocessor and are decoded in the decoder 42 to select ones of as many as four separate EPROM chips (three) are shown in the drawing.

The control circuitry 30 includes a NAND gate 54 and an IC element 56 which is a duplicate of element 42 and in practice can be half of the same package. Inputs to the NAND gate 54 include (at a terminal 57) a power supply or constant "high" level signal, a second input (to a terminal 58) is the $\overline{MRD}$ from the microprocessor as discussed above. The third input to the NAND 54 (on terminal 59) is the $\overline{MWR}$ (memory write pulse) which is also from the microprocessor and is used in its normal fashion to control the RAM memories 20a and 20b. The output of the NAND gate 54 goes to terminal 60 which is one of the "select" terminals of the element 56. On terminal 61 of the element 56 is another "select" signal which comes from the NAND 34 and is the $\overline{WAIT}$ signal. On the terminal 62 of the element 56 (which is the "enable" terminal) is the signal from the terminal 50 (after inversion). As is known, the "ROM/RAM select" signal at the terminal 50 comes indirectly from the microprocessor 10 through a latch (not shown) and enables selection of either the ROM or RAM memories. The latch is, in this embodiment, a hex type D flip-flop which serves to de-multiplex the "memory address" outputs of the microprocessor. The signals on terminals 52, 54 were also de-multiplexed in the same latch. The output $\overline{CS}$ of the element 56 is coupled to the RAM's 20 A,B and to an input of the timer 32.

Thus there has been shown and described, in accordance with the present inventions circuitry which when utilized in a portable battery-powered electronic device will conserve power by powering down or reducing power to those elements not required to be in continuous operation. This is accomplished by the use of logic circuitry in combination with the microprocessor which is an integral part of the device. With only a few added logic elements, the microprocessor and its associated memories are powered or brought to full power use for only a small fraction of time except when the unit is in an active or post-active state. The microprocessor itself and the RAMS are reduced to a quiescent state and the EPROM's are completely powered down during the bulk of the time when the portable device is in an inactive state. The microprocessor also provides the timing circuit which keeps the elements fully powered for a given period following a period of activity. It is intended to cover all equivalents of the invention as covered by the appended claims.

We claim:

1. A power conserving circuit for a two-way communications device having high and low power-level operating modes and having two operative states in the higher power mode, the device including a microprocessor, ROM memories, RAM memories and a battery, the circuit comprising in combination:

delay means coupled to receiving and delaying a RAM enabling signal indicative of the operating mode of the device;

first input means coupled to an output of the microprocessor for receiving a signal indicative of one of the two operative states of the device while operating in the high power mode;

clock means for providing a low duty cycle signal;

first logic means coupled to receive the output signals of the first input means, the clock means and the delay means for providing an operating level control signal for portions of the device;

second input means coupled to an output of the microprocessor for providing memory select signals from the microprocessor;

third input means coupled to the battery for providing a power input;

fourth input means coupled to an output of the microprocessor for providing a first memory control signal;

fifth input means coupled to an output of the microprocessor for providing a second memory control signal;

second logic means coupled to receive the output signals of the first logic means and the second, third, and fourth input means for controlling power to ones of said ROM memories;

third logic means coupled to receive the inverted output signals of the second input means and the output signals of the third, fourth and fifth input means and to the first logic means for providing an enabling signal to said RAM memories, the RAM enabling signal also being coupled to the delay means input to provide the mode indicative signal.

2. A power conserving circuit in accordance with claim 1 wherein the operating level control signal from the first logic means is provided in response to at least one of the following input signals: the clock pulse, the delayed RAM enabling signal, and the operative state indicative signal.

3. A power conserving circuit in accordance with claim 2 and wherein the operative states of the device are the "fetch" and "execute" states.

4. A power conserving circuit in accordance with claim 1 and wherein the second logic means includes a logic gate for providing a power enabling signal in response to the control signal from the first logic means, the memory select signal, and the first memory control signal.

5. A power conserving circuit in accordance with claim 4 wherein the second logic means is also coupled to receive from the microprocessor encoded ROM select signals, and wherein the second logic means includes decoder means enabled by the power enabling signal for decoding the ROM select signals, and includes switching means controlled by the decoded signals for supplying power to respective ones of the ROMs.

6. The power conserving circuit in accordance with claim 1 wherein the third logic means includes a logic gate for providing a first intermediary control signal in response to the input signals from the third, fourth and fifth input means.

7. A power conserving circuit in accordance with claim 6 wherein the third logic means further includes decoder means enabled by the memory select signal for controlling the power level supplied to the RAMs in response to the first intermediate control signal and the operating level control signal.

* * * * *